US011922525B2

(12) United States Patent
Mason et al.

(10) Patent No.: US 11,922,525 B2
(45) Date of Patent: *Mar. 5, 2024

(54) SYSTEM AND METHOD FOR BUILDING MULTIPLE ONLINE LEGAL RESEARCH APPLICATIONS

(71) Applicant: Thomson Reuters Enterprise Centre GmbH, Zug (CH)

(72) Inventors: Eamon Mason, Surrey (GB); Andre Lambrechts, Baar (CH)

(73) Assignee: Thomson Reuters Enterprise Centre GmbH, Zug (CH)

( * ) Notice: Subject to any disclaimer, the term of this patent is extended or adjusted under 35 U.S.C. 154(b) by 57 days.

This patent is subject to a terminal disclaimer.

(21) Appl. No.: 16/653,881

(22) Filed: Oct. 15, 2019

(65) Prior Publication Data
US 2020/0043111 A1    Feb. 6, 2020

Related U.S. Application Data

(63) Continuation of application No. 15/434,594, filed on Feb. 16, 2017, now Pat. No. 10,467,715, which is a
(Continued)

(51) Int. Cl.
*G06Q 50/18*    (2012.01)
*G06F 3/06*    (2006.01)
(Continued)

(52) U.S. Cl.
CPC .......... *G06Q 50/18* (2013.01); *G06F 3/0619* (2013.01); *G06F 3/065* (2013.01); *G06F 3/067* (2013.01);
(Continued)

(58) Field of Classification Search
CPC ......... G06F 17/30011; G06F 17/30867; G06F 16/24561; G06F 3/065; G06F 16/252;
(Continued)

(56) References Cited

U.S. PATENT DOCUMENTS 5,870,550 A    2/1999    Wesinger, Jr. et al.
6,141,659 A  * 10/2000   Barker .................... G06F 16/33
                                                  707/999.102

(Continued)

FOREIGN PATENT DOCUMENTS

CN    102187360 B    5/2016
EP      2332116 A1    6/2011
(Continued)

OTHER PUBLICATIONS

International Search Report and Written Opinion issued in corresponding PCT Application No. PCT/IB2009/006694, dated Dec. 7, 2009, 8 pages.

(Continued)

*Primary Examiner* — Kuen S Lu
(74) *Attorney, Agent, or Firm* — Norton Rose Fulbright US LLP

(57) ABSTRACT

The present inventors devised, among other things, an application development system and method. One exemplary method entails providing a set of legal research application feature or functions and receiving a first configuration file from a user, selectively enabling or disabling one or more of the features to define a first legal research application on a first server for a first country. The method further entails receiving a second configuration file from a user, which similarly selectively enables of disables one or more of the features to define a second legal research application on a second server for a second country. The configuration files also customize the user interfaces accord to brand specific criteria for each of the countries.

18 Claims, 2 Drawing Sheets

Related U.S. Application Data continuation of application No. 12/534,692, filed on Aug. 3, 2009, now Pat. No. 9,607,057.

(60) Provisional application No. 61/137,712, filed on Aug. 1, 2008.

(51) Int. Cl.
| | | |
|---|---|---|
| *G06F 16/22* | | (2019.01) |
| *G06F 16/2455* | | (2019.01) |
| *G06F 16/25* | | (2019.01) |
| *G06Q 10/10* | | (2023.01) |

(52) U.S. Cl.
CPC .... *G06F 16/2291* (2019.01); *G06F 16/24561* (2019.01); *G06F 16/252* (2019.01); *G06Q 10/10* (2013.01)

(58) Field of Classification Search
CPC .... G06F 3/067; G06F 16/2291; G06F 3/0619; G06Q 10/10; G06Q 50/18
USPC ................ 707/999.003, 706, 779, 758, 604
See application file for complete search history.

(56) References Cited

U.S. PATENT DOCUMENTS

| | | | |
|---|---|---|---|
| 6,167,369 | A | 12/2000 | Schulze |
| 7,036,121 | B1 | 4/2006 | Casabona et al. |
| 7,085,755 | B2 * | 8/2006 | Bluhm ................ G06F 16/9535 |
| 7,207,005 | B2 | 4/2007 | Lakritz |
| 8,165,911 | B1 * | 4/2012 | Sanil .................. G06Q 30/0205 |
| | | | 705/7.34 |
| 9,607,057 | B2 | 3/2017 | Mason et al. |
| 10,650,058 | B2 * | 5/2020 | Conrad ................ G06F 16/245 |
| 2003/0191719 | A1 * | 10/2003 | Ginter ..................... G06F 21/86 |
| | | | 375/E7.009 |
| 2004/0003388 | A1 | 1/2004 | Jacquemot et al. |
| 2004/0088142 | A1 * | 5/2004 | Ashley ................... H04L 41/06 |
| | | | 702/184 |
| 2004/0138979 | A1 | 7/2004 | Juhre et al. |
| 2005/0149343 | A1 | 7/2005 | Rhoads et al. |
| 2005/0177358 | A1 | 8/2005 | Melomed et al. |
| 2005/0251488 | A1 | 11/2005 | Saunders et al. |
| 2006/0010434 | A1 * | 1/2006 | Herzog ............... G06F 9/44505 |
| | | | 717/168 |
| 2006/0156278 | A1 | 7/2006 | Reager |
| 2006/0277187 | A1 | 12/2006 | Roese et al. |
| 2007/0239706 | A1 * | 10/2007 | Zhang .................. G06F 16/382 |
| | | | 707/999.005 |
| 2007/0268523 | A1 * | 11/2007 | Ferrara .................. G06Q 30/02 |
| | | | 358/1.18 |
| 2007/0276854 | A1 * | 11/2007 | Gold ......................... G06F 7/24 |
| 2008/0071772 | A1 | 3/2008 | Rosenoff et al. |
| 2009/0217196 | A1 | 8/2009 | Neff |
| 2009/0240689 | A1 | 9/2009 | Fenne et al. |
| 2010/0030749 | A1 | 2/2010 | Dahn |
| 2011/0156880 | A1 | 6/2011 | Rygaard et al. |
| 2014/0056181 | A1 | 2/2014 | Croak et al. |

FOREIGN PATENT DOCUMENTS

| | | |
|---|---|---|
| WO | WO-2004/061619 A2 | 7/2004 |
| WO | WO-2007/041688 A1 | 4/2007 |
| WO | WO-2008/033511 A2 | 3/2008 |
| WO | WO-2010/013140 A1 | 2/2010 |

OTHER PUBLICATIONS

International Preliminary Report on Patentability and Written Opinion issued in corresponding PCT Application No. PCT/IB2009/006694, dated Feb. 10, 2011, 7 pages.

Summons to attend oral proceedings in corresponding EP Application No. 09786197.5 mailed on Jan. 10, 2014, 10 pages.

First Office Action mailed in corresponding Chinese application No. 200980134243.1, dated Jun. 14, 2012.

Response to First Office Action filed in corresponding Chinese application No. 200980134243.1, dated Jan. 4, 2013.

Second Office Action mailed in corresponding Chinese application No. 200980134243.1, dated Apr. 3, 2015.

Response to Second Office Action filed in corresponding Chinese application No. 200980134243.1, dated Aug. 18, 2015.

Third Office Action mailed in corresponding Chinese application No. 200980134243.1, dated Nov. 2, 2015.

Response to Third Office Action filed in corresponding Chinese application No. 200980134243.1, dated Jan. 5, 2016.

Notification to Grant Patent Right for invention mailed in corresponding Chinese application No. 20098013243.1, dated Mar. 4, 2016.

Decision to refuse issued in corresponding EP application No. 09786197.5, dated May 3, 2014.

* cited by examiner

SYSTEM AND METHOD FOR BUILDING MULTIPLE ONLINE LEGAL RESEARCH APPLICATIONS

CROSS-REFERENCE TO RELATED APPLICATIONS

The present application is a continuation application of U.S. patent application Ser. No. 15/434,594 filed Feb. 16, 2017 and entitled "SYSTEM AND METHOD FOR BUILDING MULTIPLE ONLINE LEGAL RESEARCH APPLICATIONS," which is a continuation of U.S. patent application Ser. No. 12/534,692 filed Aug. 3, 2009 and entitled "SYSTEM AND METHOD FOR BUILDING MULTIPLE ONLINE LEGAL RESEARCH APPLICATIONS," and issued on Mar. 28, 2017 as U.S. Pat. No. 9,607,057, which claims priority to U.S. Provisional Application No. 61/137,712 filed Aug. 1, 2008 and entitled "SYSTEM, METHODS AND INTERFACES FOR A MULTIPLE APPLICATION FRAMEWORK," the disclosures of which are incorporated herein by reference in their entirety.

COPYRIGHT NOTICE

A portion of this patent document contains material subject to copyright protection. The copyright owner has no objection to the facsimile reproduction by anyone of the patent document or the patent disclosure, as it appears in the Patent and Trademark Office patent files or records, buy otherwise reserves all copyrights whatsoever. The following notice applies to this document: Copyright © 2017, Thomson Reuters.

TECHNICAL FIELD

Various embodiments of the present invention concern online legal research applications, particularly systems and method of efficiently providing these applications across multiple countries.

BACKGROUND

In many legal systems across the world, lawyers and other legal professionals research laws and past court decisions to help them serve the legal needs of their clients. To assist these legal professionals, businesses, such as Thomson Reuters, provide online legal research services, such as the popular Westlaw service, that provides not only rich databases and technically advanced search tools, but also sophisticated case analysis and alert functions. Thomson Reuters provides similar online legal research services in Argentina, Australia, Canada, Chile, Denmark, Hong Kong. Japan, New Zealand. South Africa, Spain. Sweden, Switzerland, and the United Kingdom.

One problem that the present inventors recognized is that developing and providing online legal research services, particularly the software applications that actually make it possible to deliver the services, is time consuming and expensive. Moreover, when providing these applications in multiple countries, which have different languages, laws and ways of organizing and researching laws and past legal decisions, the time and expense multiplies. The magnitude of these costs raises the question of whether the cost for developing or even updating a research application for smaller country, such as Argentina. Denmark. or Spain is justified given the size of the legal market and desire to achieve a reasonable return on investment.

Accordingly, the present inventors recognized a need for better ways of building online legal research applications.

SUMMARY

To address this and/or other needs, the present inventors devises, among other things, an application development system and method. One exemplary method entails providing a set of legal research application feature or functions and receiving a first configuration file from a user, selectively enabling or disabling one or more of the features to define a first legal research application on first server for a first country. The method further entails receiving a second configuration file from a user, which similarly selectively enables or disables one or more of the features to define a second legal research application on a second server for a second country. The configuration files also customize the user interfaces accord to brand specific criteria for each of the countries. Some systems embodiments employing the methodology outlined here support approximately 20 products in 12 countries using 7 different languages.

Moreover, the exemplary embodiments provide search templates that translate user input into a user interface into appropriate queries for the jurisdictional specific databases. The search templates can be shared across legal research applications, enabling, for example, users of an application for UK legal research to potentially research case law in Denmark.

Some embodiments also provide a configuration-selectable tocectory feature. This feature provides a hierarchical table-of-contents type method of navigating an searching legal contents, with the content associated with metadata that directs how it is to be displayed and what functionality a research application provides to interact with it.

Some embodiments operate beyond that legal domain. For examples, one or more embodiments operate in the financial, scientific, healthcare and media domains. So the present invention is not limited to legal research applications.

DETAILED DESCRIPTION

This description, which incorporates the figures and the appended claims, describes one or more specific embodiments of an invention. These embodiments offered not to limit but only to exemplify and teach the inventive subject matter, are shown and described in sufficient detail to enable those skilled in the art to implement or practice the invention. Thus, where appropriate to avoid obscuring the invention, the description may omit certain information known to those of skill in the art.

Exemplary International Information-Retrieval System

Figure 1:
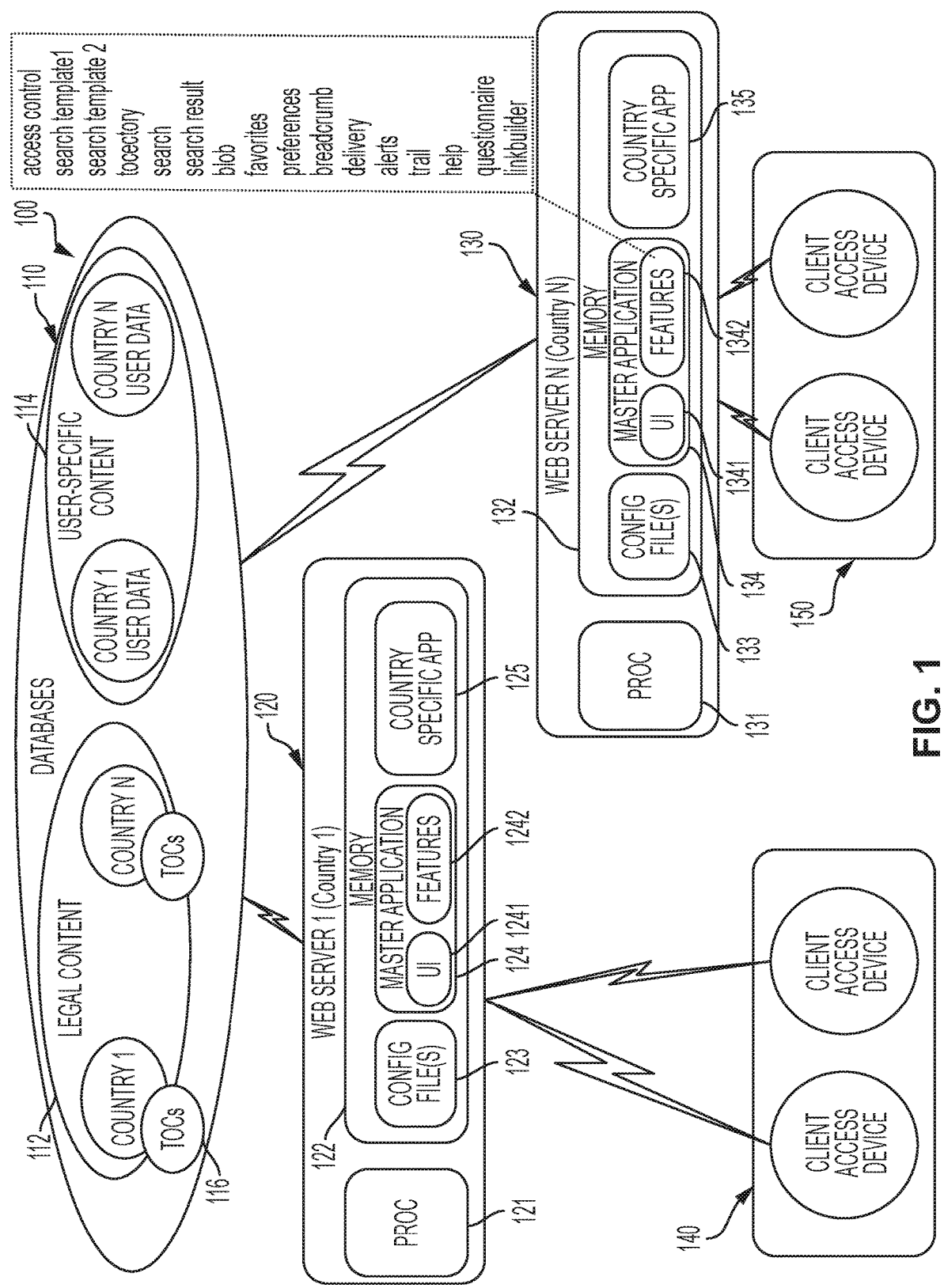
FIG. 1 is a block diagram of an exemplary multi-country legal research system which corresponds to one or more embodiments of the present invention.

FIG. 1 shows an exemplary international online information-retrieval (or legal research) system 100. System 100 includes one or more databases 110, server 120 and 130, and access devices 140 and 150.

Databases 110 include a set of legal research databases 112, and a set of user-specific content databases 114. Legal research databases 112, in the embodiment, include a case law, statutes, secondary legal research materials, and associated metadata for a variety of countries, delineated country 1, country 2 in a figure. Secondary legal research materials include legal documents of secondary legal authority or more generally authorities subordinate to case law and statutes. Metadata includes case law and statutory citation relationships, KeyCite data (depth of treatment data, quotation data, headnote assignment data, and so forth. User-specific content database include user-preference data, user usage history, such as research trails. Breadcrumb data (information regarding documents accessed by a user), accounting data, subscription data, and authentication data.

Databases 110, which take the exemplary form of one or more electronic, magnetic, or optical data-storage devices, include or are otherwise associated with respective indices (not show). Each of the indices includes terms and phrases in association with corresponding document addresses, identifiers, and other conventional information. Databases 110 are coupled or couplable via a wireless or wireline communications network, such as a local-, wide-, private-, or virtual-private network, to servers 120 and 130.

Servers 120 and 130), which is generally representative of one or more servers for serving data in the form of webpages or other markup language forms with associated applets. ActiveX controls, remote-invocation objects, or other related software and data structures to service clients of various "thicknesses." More particularly, server 120 includes a processor module 121, a memory module 122, a configuration module 123, a master application module 124, and a country specific application module 125. Similarly, server 130 includes a processor module 131, a memory module 132, a configuration module 133, a master application module 134, and a country specific application module 135. (For clarity of illustration only two servers are shown in the figure; however, the exemplary embodiment encompasses any number of country specific web servers, indeed more than one server may be ganged for a particular company. In general, the functional capabilities of these servers are identical or similar.)

More specifically, processor modules 121 and 131 each include one or more local or distributed processors, controllers, or virtual machines. In the exemplary embodiment, the processor modules assume any convenient or desirable form.

Memory module 122 and 132, which take the exemplary form of one or more electronic magnetic, or optical data-storage devices, store respective master application modules 124 and 134 and country-specific research applications 125 and 135.

Configuration modules 123 and 133 include sets of one of one or more configuration files to enable or disable one or more respective legal research application features associated with master legal research applications 124 and 134. In the exemplary embodiment, the configuration module includes XML configuration files, style sheets, java scripts, and cascading style sheets, which enable or disable particular features of the master legal research application. The style sheets related primarily to customization of master user interface 1241 and 1341 to conform to country-specific branding. In this sense, these custom, configured style sheets may be regarded as application "skins". Features 1242 and 1342 include the modular functional feature of the master application which are selectably enabled or disabled via the configuration files. Some embodiments allow for enabling or disabling or otherwise controlling operation one or more deeper aspects of the functional features, rather than just turning the feature completely on or off.

A description of an exemplary set of features follows. However, in various embodiments, the set of features is expandable to include new features that are designed to be configured by configuration files.

Searching Feature: The searching feature allows the user to search the whole application or within specific content sets for documents that suit their requirements. This can either be via a basic search that allows the user to input some basic words or via an advanced search where the user can input single or multiple pieces specific known information. The feature also allows the user to narrow search results by conducting further searches within results returned. The exemplary search feature can search multiple databases and integrate results into a single search result list and can search any field of any document (although limited by the content).

Browsing Feature: The first page the user arrives at after logging into the application allows the user to start research straight away. At the very top of the page is a toolbar with links to the most useful tools and features available on the application and this would be available on every page of the site. Users can choose to look at particular content types in more detail by using the navigation bar near the top of the page, which lists the content types available to them. Once a content type has been selected the user can browse for documents by selecting links to lists of documents that suit their requirements. Users can browse through the lists right down to document level or utilize the search templates available to narrow their search.

Result Display Feature: The results display feature of MAP finds documents that match the search criteria, sorts and de-duplicates them and then displays them to the user in the form of a list. As well as just displaying the list of search results, there are a number of features that are also available to the user via the search results list screens. Examples of these are:

Editing their search
    Conducting a new search
    Re-sorting the search results list
    Searching within the results returned
    Delivering the results list
    Saving the search to be used at a later date
    Adding the search to their alerts. RSS Feeds list and be alerted when new documents are added.

Document display feature: Document display UI design patterns within the application are the result of a combination detailed analysis, best practice and standards. As well as just displaying the document of choice, there are a number of additional features that are also available to the user via the document display feature. Some examples of these are:

Viewing related documents
    Term scrolling
    Results scrolling
    Viewing recently viewed documents
    Delivering documents Delivery: Delivery options within WLUK allow the user to print, save or e-mail search results or full text documents. As well as simply delivering the documents the user has a number of other options that can be available to them. Some examples of these are:

Document format
    Displaying highlighted search terms
    Including summary pages
    Underlining of links within the documents
    Highlighting search terms Alerts Feature: An alert allows users to stay up-to-date on new documents added and notify the users when new information is added to the system. Alerts are requests that run automatically at pre-set time intervals and the results are delivered automatically to users via email. Results include only documents added since the last time the Alert request was run. Subscribers are able to view and manage a list of their own Alerts.

RSS Feeds Feature: RSS feed comprise XML feeds of new materials added to the site that are viewable by subscribers through the subscriber's web browser. Each time a specific RSS feed is built, the previous content of the RSS feed is overwritten, meaning that material contained in an earlier RSS field can only be retained if the subscriber opts to cache the previous feed. The overall functionality is similar to Alerts and like alerts, subscribers are able to view and manage a list of their own RSS feeds.

PDF circulation List: PDF circulation lists work as Alerts and allows a user to stay up-to-date on new documents added, and notifies the user when new PDF documents are added to the system. Circulation lists are requests that run automatically at pre-set time intervals and the results are delivered automatically to users via email. Results include only documents added since the last time the request was run and subscribers are able to view and manage a list of their own Circulation lists.

Breadcrumb: The Breadcrumb feature enables users to revisit pages of an application that they have previously accessed. When the user navigates to a new page, the path of navigation taken by the user will be listed in the breadcrumb and this allows the user to see where they have been within the application and to return to pages previously viewed if required.

Trail: Trail is a feature that records the sequence of events that have been executed by the user, to enable them to view and access research carried out during that session. Users are also able access Previous Trails to view previous research conducted in earlier sessions. This feature is access controlled and can be turned on an off as required.

Saved Search: This feature allows the user to save commonly used searches for re-use at a later date. Saved searches can be created from any search results list whether the search has been conducted from the homepage, content landing pages or at any level of the tocectory and users are able to view and manage a list of their own Saved Searches. This feature is access controlled and can be turned on and off as required.

Preference feature: Preference is a feature that allows the user to alter settings according to their requirements, such as the users time zones, the number search results returned per page, the number of terms in context extracts displayed, the users E-mail address and the users Delivery Output options and format. Once the user has amended their settings they remain as the default settings until they are further amended. In the exemplary embodiment, the following items within, this feature can be also customized according to requirements for individual applications:
  Format of date and time
  Text
  Language
  Delivery option defaults
  Available delivery formats
  Available options for number of Terms in content extracts displayed
  Available options for number of Search results displayed per page Access Control feature: Access Control feature is used to set the users access to different features within the application depending on their subscription. Most features within MAAF can be switched on and off via Access Control. Examples include:
  Content sets
  Alerts/RSS Feeds/PDFs
  Delivery options
  Preference
  Trail
  Saved Search Authentication Feature: Authentication Feature includes features such as logging in, new user login, changing passwords, forgotten password and timeout. Before a user can use any of the features within the application, they must first login. There are different ways a user can login depending on the kinds of users they are. Typical types of users are:
  Users who access via a username and password
  Users who use the IP authentication feature preventing from having to login when they view a doe from alerts results, a federated search tool or via other external links
  Academic users who log in via a different login screen Billing feature: Billing is closely linked to Access Control. There are different levels of subscription and naturally different billing methods depending on the subscription type. The typical levels of subscription are:
  Users with subscription to every feature of the application
  Users with subscription to parts of the application where other content outside their subscription is completely blocked
  Users with subscription to parts of the application where other content outside their subscription is on a Pay per View (PPV) basis.

Billing events are generated for the activities such as searching, viewing documents including PDFs, document delivery and acceptance of PPV items. Another feature within billing is the ability to use Client ID against billable activity to distinguish between research carried out for one client and another.

Web API feature: There are specific software providers who offer a range of federated searching tools for academic and commercial sectors. Web API Feature is an interface between the application and third party software providers in order to support federated searching. The Web API currently offers a search service and using third party software, a search request is sent to the application, and search results are returned to the end user. It is capable of searching all of the content collections configured for the application and searching of any of the configured fields appropriate to each collection. All the applications' collection sets and content sources would be available to the Federated searching tools. This is configurable to suit the end users needs, therefore bespoke collections sets that allow the users to search 2 specific content types at the same time could be created. There is also flexibility in the feature to search across all or specific fields available on basic and advanced templates for each collection as each customer will have different requirement for a federated search.

The search results displayed to the user are the same as if the search had been conducted within the application and contains all relevant links. By clicking links users can access the Document Display feature within the application, and view their selected document. Users also have the ability to be able to edit their search and conduct searches outside of the Federated Search tool.

Linkbuilder: The Linkbuilder feature is a user interface to build deep links and allow users to create direct links to content on the application. A link can be created to a search template, a search result or to a specific document on the application. Links created can incorporate IP and Athens authentication if required and the links be used for purposes such as bulletins, reading lists or for publishing on intranets. This feature is access controlled, can be switched on and off as required.

Help Page Feature: Help pages within the application provided the user with everything they need to use the application, from the basics to more advanced techniques to get the most from the service. Help pages detail the features available within the application and how to use them, information about the source of the content, and also provides contact information on how to contact Customer Support teams. In some embodiments, help pages are accessed via links from any screen but would typically be available from on search templates for all content types and at all levels of the tocectory, and for features such as Alerts and RSS feeds.

Questionnaire Feature: The training tutorial is an interactive tool designed to guide users through every aspect of the application. At the end of the tutorial the user is able to test their knowledge of the application with an interactive test consisting of multiple choice questions. Once the user has completed the test successfully they are able to download a Training Certificate.

In addition to the master user interface 1241 and master feature set 1242, master application modules include integration capacity responsive to configuration files 123 to create a country-specific application instance 125. Generally, these instances are created at startup of the server; however, in some embodiments they are persisted in memory between startups.

Coupled via wireless or wired network connection to servers 120 and 130 are respective sets of access devices 140 and 150. In the exemplary embodiment, each access device takes the form of a personal computer, workstation, personal digital assistant, mobile telephone, or any other device capable of providing effective user interface with a server or database. Though not shown in FIG. 1, each access device includes a processor module, one or more processors (or processing circuits), a memory, a display, a keyboard, and a graphical pointer or selector. In operation, each of the access devices enables access to databases 110 through interaction with one of serves 120 or 130. The access devices may operate as thin clients or thick clients depending on their specific hardware configurations and how much of the country specific application software the device host.

Exemplary Operation

Figure 2:
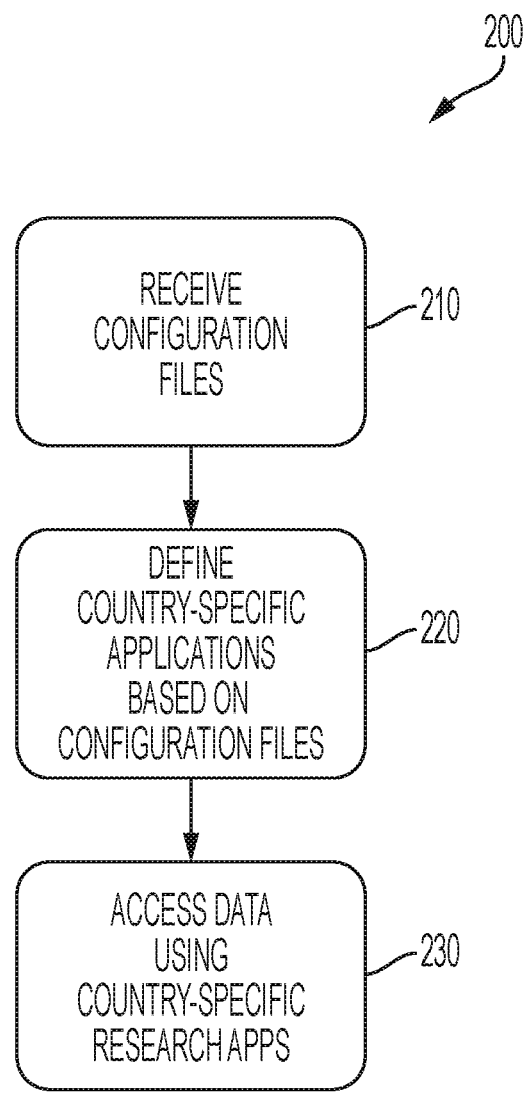
FIG. 2 is a flow chart of an exemplary method of operating the system of FIG. 1 and of providing legal research applications, which correspond to one or more embodiments of the resent invention.

FIG. 2 shows a flow chart 200 of one or more exemplary methods of operating a system, such as system 100. Flow chart 200 includes blocks 210-230, which like other blocks in this description, are arranged and described in a serial sequence in the exemplary embodiment. However, some embodiments execute two or more blocks in parallel using multiple processors or processor-like devices or a single processor organized as two or more virtual machines or sub processors. Some embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow applies to software, hardware, and firmware implementations.

Block 210 entails receiving first and second sets of one or more configuration files. In the exemplary embodiment, the configuration files are XML files, and the include parameters for enabling or disabling one or more legal research application features of respective first and second master legal research application feature sets. These legal research sets are identical and are stored in different servers in the exemplary embodiment. However, in some embodiments, one of the legal research feature sets may include features not contained in the other.

Block 220 entails defining first and second country specific legal search applications based on the first and second configuration files and master legal research application feature sets. In the exemplary embodiment, the resulting country specific legal research applications are stored in respective first and second web servers.

Block 230 entails first and second users in different countries accessing data using the first and second country specific legal research applications. In the exemplary embodiment, this access may entail use of one or more of the features selectively enabled by the corresponding configuration file. One such feature is the "TOCetory." a portmanteau term formed from table of contents (TOC) and directory/A tocectory allows a user to navigate from the highest level in the site design down to an individual document by clicking through the hierarchical structure (TOCs 116, FIG. 1). A search template can exist at each level in the hierarchy. The scope of the search corresponds to the user's location within the hierarchy.

Conclusion

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. An online legal research system comprising:
    a set of databases including first and second legal research databases;
    a first server for providing online access to the set of databases, the first server including one or more first country-specific configuration files that control selective enablement or disablement of one or more legal research application functions of a first set of legal research application functions, and an instance of a first country-specific legal research application based on the one or more first country-specific configuration files and the first set of legal research application functions, wherein the first country-specific configuration files include information for defining portions of a first user interface portion of the first country-specific legal research application; and
    a second server for providing online access to the set of databases, the second server including one or more second country-specific configuration files that control selective enablement or disablement of one or more legal research application functions of a second set of legal research application functions, wherein the legal research application functions enabled by the first country-specific configuration files differ from the legal research application functions enabled by the second country-specific configuration files, and an instance of a second country-specific legal research application based on the one or more second country-specific configuration files and the second set of legal research application functions, wherein the second country-specific configuration files include information for defining portions of a second user interface portion of the second country-specific legal research application.

2. The online legal research system of claim 1, wherein the set of databases are delineated by country and secondary legal research information.

3. The online legal research search system of claim 1, wherein the first server executes the first country-specific legal research application accessed from a first country-specific memory.

4. The online legal research system of claim 3, further comprising: a first master application module that integrates the first country-specific configuration files thereby creating at least one instance of the first country-specific legal research application and storing the at least one instance of the first country-specific legal research application in a memory for subsequent access by the first server.

5. The online legal research system of claim 4, wherein the online legal research system further comprises at least one search template that translates user input at a user interface into appropriate queries for the first and second legal research databases, the search template being operative to be shared among the first and second country-specific legal research applications.

6. The online legal research system of claim 5 further comprising: a client access device for receiving the user interface, the user interface being customizable based on specific criteria associated with at least a first country as stored in the first master application module, the user interface thereby conforming to a first branding.

7. The online legal research system of claim 1, wherein the second server executes the second country-specific legal research application accessed from a second country-specific memory.

8. The online legal research system of claim 7, further comprising: a second master application module that integrates the second country-specific configuration files thereby creating at least one instance of the second country-specific legal research application and storing the at least one instance of the second country-specific legal research application in a memory for subsequent access by the second server.

9. The online legal research system of claim 1 wherein the first and second sets of legal research application functions are identical.

10. The online legal research system of claim 1, wherein the first and second country-specific legal research applications are tailored for respective first and second languages.

11. The online legal research system of claim 1, wherein each of the first and second sets of legal research application functions includes a tocectory function.

12. The online legal research system of claim 1, wherein each of the first and second sets of legal research application functions includes first and second search templates for converting user input into respective first and second query languages.

13. The online legal research system of claim 1, further configured to interact with first and second sets of one or more client access devices, wherein the first set of client access devices is located in a first country which has a first official language and the second set of client access devices is located in a second country which has a second official language, wherein the second official language is different from the first official language.

14. A method of conducting online legal research comprising:
receiving a first set of country-specific configuration files and a second set of country-specific configuration files, wherein the first and second sets of country-specific configuration files indicate selective enablement or disablement of one or more legal research application functions, and wherein the legal research application functions enabled by the first set of country-specific configuration files differs from the legal research application functions enabled by the second set of country-specific configuration files;
generating an instance of a first country-specific legal research application, wherein the instance of the first country-specific legal research application is configured to be executed in a first country-specific web server and is based on applying the first set of country-specific configuration files against a first set of legal application functions, wherein the first set of country-specific configuration files include information for defining portions of a first user interface portion of the first country-specific legal research application; and
generating an instance of a second country-specific legal research application, wherein the instance of the second country-specific legal research application is configured to be executed in a second country-specific web server and is based on applying the second set of country-specific configuration files against a second set of legal application functions, wherein the second set of country-specific configuration files include information for defining portions of a second user interface portion of the second country-specific legal research application.

15. The method of claim 14, wherein at least one of the first and second sets of country-specific configuration files indicates enablement of an access control function.

16. The method of claim 14, further comprising integrating the first set of country-specific configuration files using a first master application module thereby creating at least one instance of the first country-specific legal research application and storing the at least one instance of the first country-specific legal research application in a first country-specific memory for subsequent access by the first country-specific web server.

17. The method of claim 16, further comprising receiving a user interface in a client access device, the user interface being customizable based on specific criteria associated with at least a first country as stored in the first master application module, the user interface thereby conforming to a first country-specific branding.

18. The method of claim 14, further comprising integrating the second set of country-specific configuration files using a second master application module thereby creating at least one instance of the second country-specific legal research application and storing the at least one instance of the second country-specific legal research application in a second country-specific memory for subsequent access by the second country-specific web server.

* * * * *

UNITED STATES PATENT AND TRADEMARK OFFICE
CERTIFICATE OF CORRECTION

PATENT NO. : 11,922,525 B2
APPLICATION NO. : 16/653881
DATED : March 5, 2024
INVENTOR(S) : Eamon Mason et al.

Page 1 of 1

It is certified that error appears in the above-identified patent and that said Letters Patent is hereby corrected as shown below:

In the Specification

At Column 1, beginning at Line number 52, delete "Hong Kong. Japan, New Zealand. South Africa, Spain." and replace with --Hong Kong, Japan, New Zealand, South Africa, Spain,--.
At Column 1, Line number 65, delete "Argentina. Denmark. or Spain" and replace with --Argentina, Denmark, or Spain--.
At Column 3, Line number 25, delete "130)," and replace with --130,--.
At Column 3, Line number 27, delete "applets." and replace with --applets,--.
At Column 4, Line number 33, delete "MAP" and replace with --MAF--.
At Column 4, Line number 45, delete "alerts." and replace --alerts,--.
At Column 6, Line number 21, delete "view a doe" and replace with --view a doc--.

Signed and Sealed this
Second Day of April, 2024

*Katherine Kelly Vidal*

Katherine Kelly Vidal
*Director of the United States Patent and Trademark Office*